United States Patent [19]

Bowerfind et al.

[11] 3,772,817
[45] Nov. 20, 1973

[54] HANDLE AND REEL MOUNT CONSTRUCTION

[75] Inventors: Albert L. Bowerfind, East Paterson, N.J.; Leonard H. Sobel, Rockaway Park, N.Y.; Zvi Aviezer, New York, N.Y.

[73] Assignee: Daggem, Inc., New York, N.Y.

[22] Filed: Jan. 7, 1972

[21] Appl. No.: 216,186

[52] U.S. Cl. .................................................. 43/22
[51] Int. Cl. ............................................ A01k 87/06
[58] Field of Search ........................... 43/22, 18, 23

[56] References Cited
UNITED STATES PATENTS

| | | | |
|---|---|---|---|
| 3,080,673 | 3/1963 | Smith | 43/22 |
| 3,102,358 | 9/1963 | Steinle | 43/22 |
| 2,863,251 | 12/1958 | Ackerman | 43/22 X |
| 3,269,049 | 8/1966 | Emmons | 43/22 X |
| 3,426,466 | 2/1969 | Shepherd | 43/22 |
| 3,618,253 | 11/1971 | Edwards et al. | 43/22 X |
| 3,522,674 | 8/1970 | Hardesty | 43/22 |
| 3,501,859 | 3/1970 | Perkins | 43/22 |

Primary Examiner—Louis G. Mancene
Assistant Examiner—James H. Czerwonky
Attorney—Jacobs & Jacobs

[57] ABSTRACT

A simple, inexpensive and advantageous construction is provided for the handle and reel mounting of a fishing rod wherein multi-level chock means are provided for accommodating reels of different sizes and dimensions so that the fishing line can be axially fed into or retracted from the associated hollow collapsible fishing rod. A threaded boss and screw arrangement, mounted in a U-shaped member, locks and unlocks the positioned reel, the base or flange of which is receivable in any pair of oppositely facing channels formed in a channeled end piece and in one of the upstanding portions of the U-shaped member. The U-shaped member is slidably fitted into a depressed intermediate portion of the fishing rod handle and the channeled end piece is mounted at the opposite end of the intermediate portion.

7 Claims, 3 Drawing Figures

PATENTED NOV 20 1973 3,772,817

HANDLE AND REEL MOUNT CONSTRUCTION

The present invention relates to a handle and reel mount construction especially designed for a fishing rod of the hollow or tubular, telescopic or collapsible type. The construction generally comprises a handle member having a depressed intermediate portion with a flat or smooth bottom bounded by inclined walls and wherein the flat bottom terminates in downturned ends for the reception of channeled members into which the bottom flange of the fishing reel can be secured at different elevations and inclinations. The handle member is preferably made of a suitable synthetic plastic which is light and strong and resistant to deformation during use. The synthetic plastic is preferably that known as polycarbonate, but other synthetic plastics may be employed.

A preferred embodiment of the invention is illustrated in the accompanying drawing, wherein.

Figure 1:
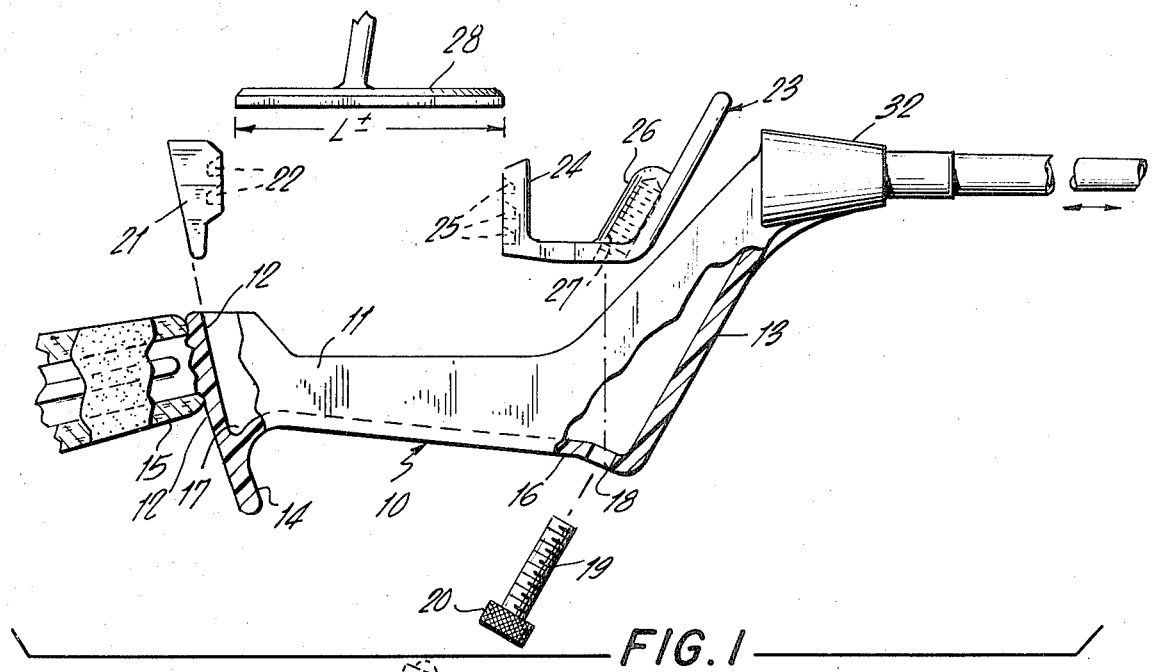
FIG. 1 is an exploded fragmentary elevational view partly in section of that part of the fishing rod constituting the invention.

Referring to the drawing, the numeral 10 designates in general the handle and reel mount construction constituting the present invention and wherein there is a handle member proper 11 having upwardly inclined walls 12 and 13 of which wall 12 is considerably shorter than wall 13 and in which wall 12 has a depending extention 14 which acts as a hand or finger grip when the fishing rod is held during use, it being noted also that associated with wall 12 there is shown a portion 15 which is a part of a downwardly inclined handle end which fits into the palm of the hand of the user.

Handle member proper 11 has a flat bottom 16 which terminates adjacent wall 12 in a downturned end forming a recess 17 and at the opposite end of member 16 is an aperture 18 for the reception of a threaded screw 19 having a knurled head 20 for a purpose to be explained. The channeled end piece 21 of generally triangular shape is provided with a plurality of transverse channels 22 and the rearward surface of member 21 is adapted to be adhesively secured to the inner surface of wall 12 in the position shown in FIG. 2. The generally U-shaped element 23 has a forward upstanding portion 24 also provided with a plurality of transverse channels 25 which face or oppose channels 22 in member 21. In addition, member 23 has a boss 26 which is internally threaded at 27 so that when member 23 is positioned as shown in FIG. 2 the threaded screw 19 fits into the threaded boss 26 and by turning knurled head 20 in clockwise or counterclockwise direction, the member 23 may be drawn forward or moved somewhat away from the bottom 16 of handle member 11.

Figure 2:
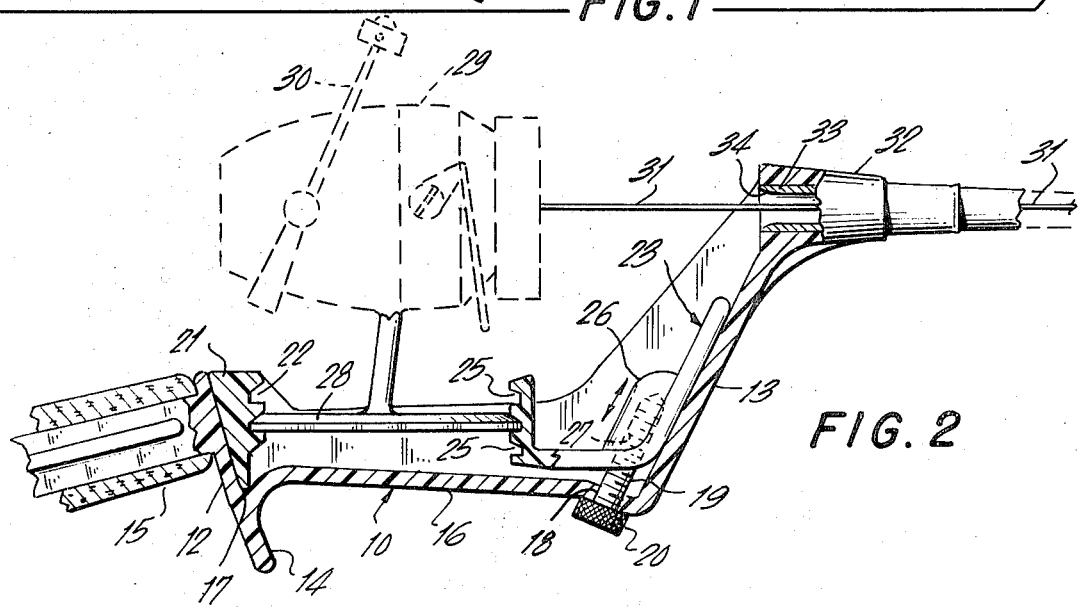
FIG. 2 is a view similar to FIG. 1, but with the parts assembled.

FIG. 1 illustrates the invention in disassembled condition to show the individual parts which are shown in assembled condition ready for use in FIG. 2, wherein the lower flange 28 is shown in the lowermost channel 22 and the intermediate channel 25, so that the fishing reel indicated at 29 and which is provided in the usual manner with a reeling and unreeling member 30, places the fishing line 31 in axial alignment with the bore of fishing rod 32 which may for example be of the character set forth in co-pending application Ser. No. 178,761 filed Sept. 8, 1971, the contents of which are hereby made a part hereof. Depending upon fishing conditions, as will be understood by fishermen, there are some circumstances where intentionally or unintentionally the fishing line 31 assumes a different position with respect to the bore of the fishing rod, and as will be understood from said co-pending application, the insert piece 33 has a rounded or smoothly curved terminus 34 to prevent undue wear or piercing of the fishing line 31 which is usually made of nylon, but which may be made of any suitable filamentary material.

Figure 3:
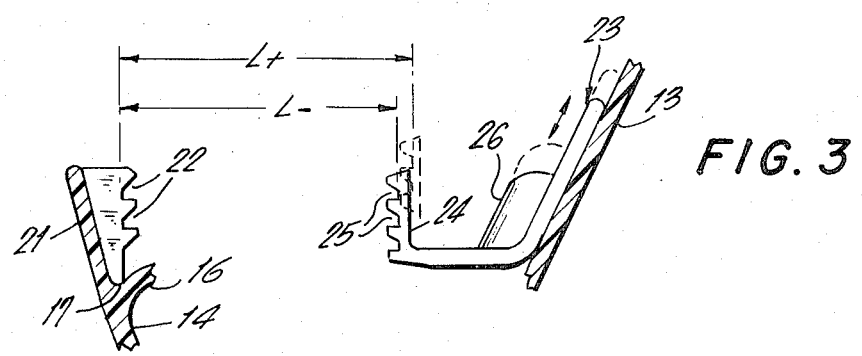
FIG. 3 is a detailed fragmentary sectional view partly in elevation of the reel mounting elements.

It will be observed from FIG. 3 that the flange 28 of reel 29 can be given a variety of spaced apart positions designated by symbols $L^+$ and $L^-$ depending upon the particular channels 22 and 25 into which the same is fitted and further that by the above described movements of screw 19 the position of U-shaped element 23 can be altered so as to change the relative inclination of the reel 29 with respect to the fishing rod 32 and hence maintain the axial (or angular) relationship of the fishing line 31 to the bore of the fishing rod, which, as explained in said copending application, may be telescopic or non-telescopic and which is preferably made of fiberglas, although metal such as aluminum and suitable synthetic plastics may alternatively be employed.

Thus in effect there is provided a multi-level chock to accommodate reels of different sizes and dimensions and to ensure that the fishing line is axially aligned with the bore of the hollow fishing rod, where such alignment is desired as is usually the case. The screw and boss arrangement described above serves to lock and unlock the reel in its adjusted position.

The arrangement provided is simple and inexpensive to produce and to assemble and to use and provides the fishing rod with advantageous verstility during use as well as contributing to the efficiency of the rod due to the construction described above and the use of a downwardly inclined handgrip which has been found to be exceptionally effective in a fishing rod of the present type. Their parts require no servicing and are of long useful life and may be used for salt water fishing without corrosion as well as for fresh water fishing. The invention resides primarily in the combination of structural features and elements.

What is claimed is:

1. A handle and reel mount construction comprising a handle member having a depressed intermediate portion with a flat bottom and upwardly inclined end walls, the flat bottom terminating in opposite downturned ends, a transversely multi-channeled end-piece fitted into and secured in one of said downturned ends and abutting one of said inclined walls, a generally U-shaped element having a base, releasably mounted on said bottom, and two upstanding portions, one of said upstanding portions having transverse channels, facing the end-piece channels, and the other and taller of said upstanding portions being slidably supported by the other inclined end wall, said taller portion having an internally threaded boss forming a part thereof and received in the opposite downturned end, said boss extending substantially parallel to said other inclined end wall, opposite downturned end having; an aperture extending through the flat bottom, a headed screw extending through the aperture into the threaded boss to permit raising and lowering of the U-shaped element and a reel bottom flange receivable in any facing pair of said channels and maintained in seleced position by advancing and retracting said screw in said threaded boss.

2. A handle and reel mount construction according to claim 1, wherein each of the channeled end-pieces is provided with a plurality of transverse, vertically arranged channels.

3. A handle and reel mount construction according to claim 2, wherein the handle proper and the channeled end-pieces are composed of synthetic plastic.

4. A handle and reel mount construction according to claim 3, wherein the synthetic plastic is polycarbonate.

5. A handle and reel mount construction according to claim 1, wherein the reel the flange of which is positioned in said channels is arranged with its fishing line in axial alignment with the bore of an associated fishing rod.

6. A handle and reel mount construction according to claim 1, wherein the reel the flange of which is positioned in said channels is arranged with its fishing line in non-axial alignment with in the bore of an associated fishing rod.

7. A handle and reel mount construction according to claim 1, wherein each of the channeled end-pieces is provided with a plurality of channels adapted to receive and hold the bottom flange of an associated reel, the handle proper and the channeled end-pieces are composed of polycarbonate or other synthetic plastic or aluminum and the consturction and arrangement is such that a nylon fishing line wound on the associated reel is in axial or non-axial alignment with the bore of a hollow, telescopic or non-telescopic fiberglas fishing rod having a downwardly inclined hand grip.

* * * * *